United States Patent [19]

Kindel

[11] 4,439,897
[45] Apr. 3, 1984

[54] DEAD-END APPLIANCE FOR LINEAR BODIES

[75] Inventor: Robert S. Kindel, Cleveland, Ohio

[73] Assignee: Preformed Line Products Company, Mayfield Village, Ohio

[21] Appl. No.: 333,406

[22] Filed: Dec. 22, 1981

[51] Int. Cl.³ .............................................. F16G 11/12
[52] U.S. Cl. ................... 24/115 N; 24/122.3; 24/122.6; 174/79; 57/212
[58] Field of Search ............... 24/115 R, 122.3, 122.6, 24/230.5 W, 265 H, 115 N; 174/79, 173; 57/212

[56] References Cited

U.S. PATENT DOCUMENTS

| | | | |
|---|---|---|---|
| 3,220,677 | 11/1965 | Sweeney | 174/79 |
| 3,284,863 | 11/1966 | Lindsey | 174/79 |
| 3,286,023 | 11/1966 | Eucker | 174/173 |
| 3,295,311 | 1/1967 | Butz et al. | 57/145 |
| 3,299,626 | 1/1967 | Payer et al. | 57/145 |
| 3,340,351 | 9/1967 | Tiernan, Jr. | 174/79 |
| 3,455,099 | 7/1969 | Butz | 57/145 |
| 3,618,308 | 11/1971 | Little | 57/145 |

*Primary Examiner*—Robert P. Swiatek
*Assistant Examiner*—David I. Tarnoff
*Attorney, Agent, or Firm*—Fay & Sharpe

[57] ABSTRACT

A dead-end appliance for linear bodies including a pair of elongated legs, each of which is helically coiled along the length thereof for grippingly receiving a portion of a linear body. An integral connecting portion connects the legs at one end thereof and includes integral pin receiving eyes and a bight portion. The eyes have eye axes lying in a plane extending perpendicular to the legs, and the bight portion is positioned for attachment of a linear body tensioning device thereto extending therefrom on the same side of the plane as the legs.

11 Claims, 7 Drawing Figures

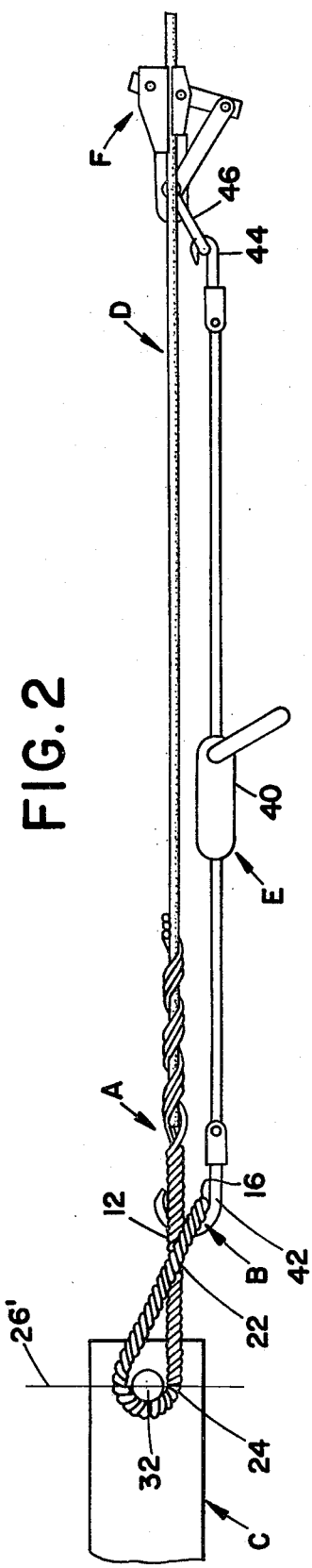
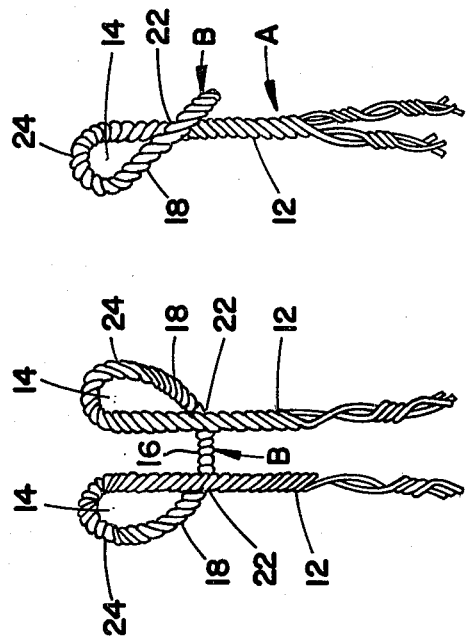
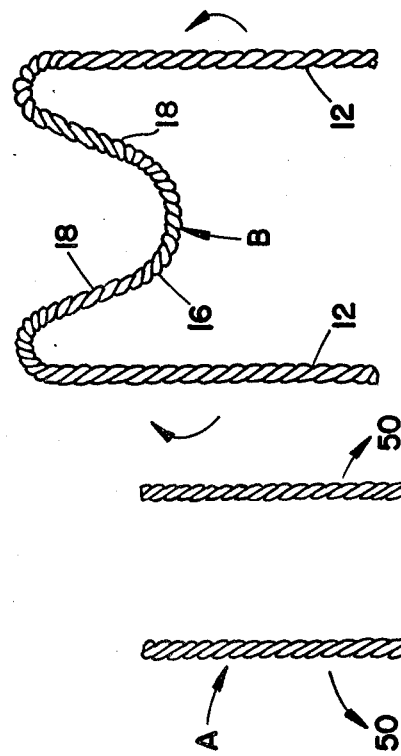
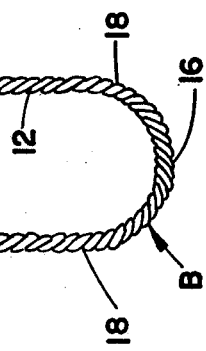

DEAD-END APPLIANCE FOR LINEAR BODIES

BACKGROUND OF THE INVENTION

This application relates to the art of dead-end appliances and, more particularly, to such appliances which grippingly engage linear bodies for connecting same to insulators or other termination fittings.

The invention is particularly applicable to a new and improved dead-end appliance which is particularly adapted for use in tensioning an electrical cable which is suspended between towers or the like and will be described with particular reference thereto. However, it will be appreciated that the invention has far broader applications and may be adapted to use in other environments.

One prior dead-end appliance is disclosed in U.S. Pat. No. 3,618,308 to J. C. Little, issued Nov. 9, 1971. The appliance there disclosed includes a pair of elongated helically formed legs integrally connected at one end by a curved bight portion. The helical legs are adapted to grippingly engage a linear body while a pin is received through the bight portion for connecting same to a termination point. When it is desirable or necessary to tension the linear body, it is necessary to provide a special termination fitting to which a hook of a block and tackle or other tensioning mechanism can be connected.

It has been considered desirable to provide a dead-end appliance having a connecting point on the appliance itself for attaching a tensioning mechanism thereto. This then would eliminate the necessity of having to use a special fitting at the termination point to facilitate ease of dead-end installation.

The present invention contemplates a new and improved device which meets these desires and others and provides a dead-end appliance for linear bodies which is simple, economical, effective, and readily adapted to a wide range of practical applications.

BRIEF DESCRIPTION OF THE INVENTION

A dead-end appliance for linear bodies includes a pair of elongated legs, each of which includes gripping means for grippingly engaging a portion of a linear body. In a preferred arrangement, the elongated legs are helically coiled along the length thereof to define the gripping means. An integral connecting portion connects the legs at one end thereof and includes integral pin receiving eyes and a bight portion. The eyes have eye axes lying in a plane extending generally perpendicular to the legs. The bight portion is positioned for attachment of a linear body tensioning device thereto extending therefrom on the same side of the plane as the legs.

In a preferred arrangement, the bight portion itself extends from the eyes on the same side of the plane as the legs.

The legs preferably extend from the eyes between and inside the bight portion as opposed to extending outside of the bight portion. In other words, the eyes and the bight portion are located on opposite sides of the legs.

The bight portion of the appliance is generally U-shaped and includes a curved base having arms extending therefrom towards the eyes with the arms and the legs crossing one another at looped portions which define the eyes. These looped portions may be formed as double looped portions. The arms, curved base and looped portions define a connecting portion which connects the legs. The curved base of the bight portion is located on one side of the points where the arms and legs cross one another and the eyes are located on the other side of such points.

The principal object of the present invention is to provide a new and improved dead-end appliance having integral means thereon for connecting a linear body tensioning device thereto.

An additional object of the invention is the provision of such an appliance which is very economical to manufacture and very simple to use in the field.

A further object of the invention resides in the provision of a dead-end appliance comprised entirely of metal rods and does not require any casting, molding, forging, or welding.

BRIEF DESCRIPTION OF THE DRAWINGS

The invention may take form in certain parts and arrangements of parts, preferred embodiments of which will be described in detail and illustrated in the accompanying drawings which form a part hereof and wherein:

FIG. 2 is a side elevational view of the appliance of FIG. 1 connected to a termination and to a linear body with a linear body tensioning device also being attached thereto;

FIGS. 4-7 show progressive bending steps of one method for shaping an appliance to the configuration of the subject new dead-end.

DETAILED DESCRIPTION OF PREFERRED EMBODIMENTS

Figure 1:
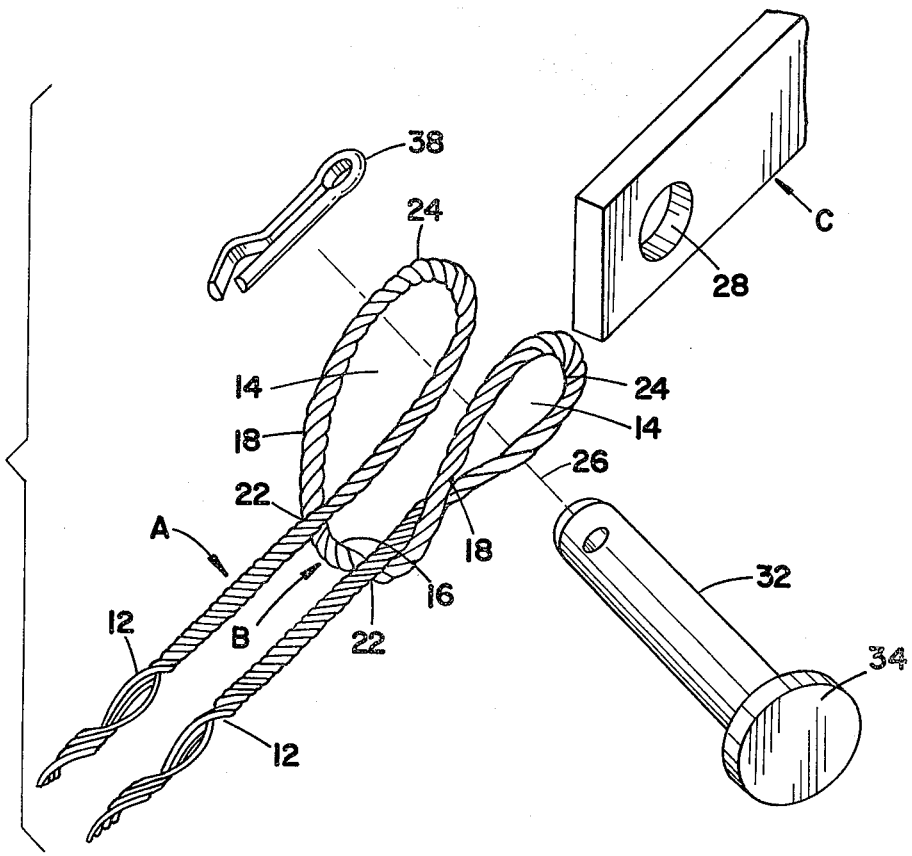
FIG. 1 is a perspective view of an improved dead-end appliance constructed in accordance with the invention.

With reference to the drawings wherein the showings are for purposes of illustrating preferred embodiments of the invention only and not for purposes of limiting same, FIG. 1 shows a dead-end appliance A constructed in accordance with the present invention. Appliance A is formed of relatively rigid metal wires or rods as known in the art and explained in, for example, the aforementioned U.S. Pat. No. 3,618,308. Appliance A includes a pair of elongated legs 12 which are formed to have an open helical construction over a major portion of the lengths thereof. This allows legs 12 to be applied in gripping relationship to linear bodies, such as wires, cables, and strands, in a known manner. An integral, generally U-shaped cabled or tightened helical bight portion generally designated B defines part of a connecting portion which interconnects legs 12 at similarly cabled areas thereof. Integral pin receiving eyes 14 are interposed between legs 12 and bight portion B for use in a manner to be described.

More particularly, the integral connecting portion which interconnects the legs includes a cabled bight portion B having a generally U-shaped base portion 16 having opposite arms 18 extending toward eyes 14 and crossing legs 12 at crossing points generally indicated at numerals 22. Thus, eyes 14 are formed by open loops generally indicated at numerals 24. The longitudinal axes of eyes 14 are coincidental and indicated by numeral 26 in FIG. 1. Longitudinal axis 26 also lies in a plane extending substantially perpendicular to legs 12. In the preferred arrangement, both bight portion B and legs 12 lie on the same side of that plane. Likewise, bight portion B and eyes 14 are located on opposite sides of legs 12 and on opposite sides of crossing points 22. Thus, from eyes 14 and loops 24, legs 12 extend between and inside of bight portion B. Although this is the preferred arrangement, it will be recognized that it is also possible to position legs 12 outside of bight portion B.

A termination fitting, such as an insulator or the like, includes an eye or tongue C receivable between loops 24. Eye or tongue C, in turn, includes a transverse opening 28 alignable with eyes 14 for receiving a connecting pin 32. Pin 32 is retained in position by an enlarged head 34 at one end and cotter pin or the like 38 receivable through a suitable transverse opening at the other end.

FIG. 2 shows dead-end appliance A connected to eye or tongue C of a termination fitting. Centerline 26' in FIG. 2 represents a plane passing through the longitudinal axis of the appliance eyes and extending perpendicular to legs 12. As shown, both bight portion B and legs 12 lie on the same side of plane 26'. A linear body D which is to be attached to the termination fitting by dead-end appliance A is desirably tensioned by a suitable linear body tensioning device E. This device may take many forms including, for example, a block and tackle arrangement. Such an arrangement is shown simply as a ratchet mechanism 40 having opposite hooks 42,44 which are selectively movable toward or away from one another by operation of mechanism 40.

Another appliance generally designated F is applied to the linear body D at a location spaced a substantial distance from appliance A. Appliance F may advantageously comprise a vise type of device which is commercially available and commonly referred to in the trade as "come-a-long." Hook 44 is connected at loop area 46 of appliance F while hook 42 is connected to bight portion B of appliance A. Linear body tensioning device E is then operated for moving hooks 42,44 toward one another which, in turn, tensions linear body D along substantially the entire length thereof to the right of appliance F in the view of FIG. 2. The open helix portion of legs 12 in appliance A may then conveniently be grippingly applied in a known fashion to a portion of linear body D to the left of appliance F in the FIGURE, ie., at an area of the linear body which is not in tension. Thereafter, release of linear body tensioning device E will cause linear body D to be maintained in tension by its connection through appliance A to the termination fitting. Linear body tensioning device E and appliance F are then removed for re-use at the next termination fitting.

It should be noted that linear body tensioning device E extends from bight portion B in the same general direction as legs 12. In addition, hook 42 is receivable between legs 12 for cooperation with bight portion B.

Figure 3:
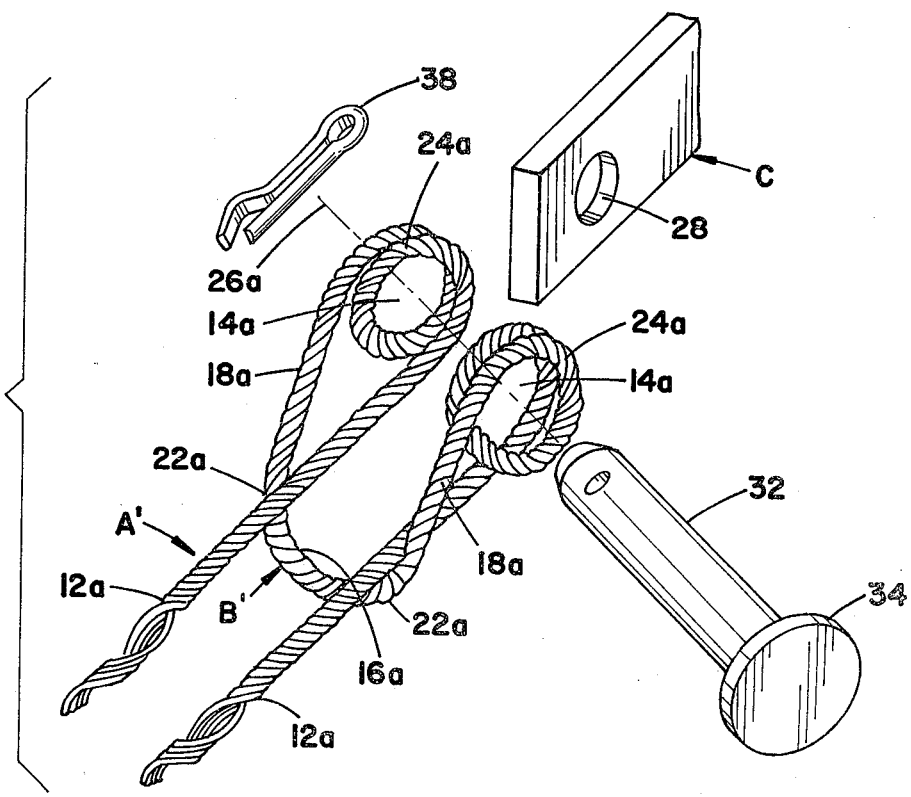
FIG. 3 is a perspective view of another embodiment of the invention.

FIG. 3 shows another arrangement wherein dead-end appliance A' has elongated legs 12a, eyes 14a, and bight portion B'. Base portion 16a of bight portion B' has arms 18a crossing legs 12a at crossing points 22a. Loops 24a are formed as double loops as opposed to the single loops 24 in the structure of FIG. 1. In other respects, the appliances are the same. Thus, legs 12a extend between and inside of bight portion B'. Axis 26a lies in a plane extending perpendicular to legs 12a, and both bight portion B' and legs 12a are located on the same side of that plane. Eyes 14a and bight portion B' are also located on opposite sides of legs 12a. The connecting portion which interconnects legs 12a includes bight portion B', arms 18a and loops 24a.

The appliance of the present application is commonly referred to as a distribution grip dead-end because it is used in the power distribution environment (low voltages, customer service) as opposed to power transmission (high voltages, as between generating plants and substations). The improved appliance of the present application may be used on an end portion of a linear body where the linear body terminates or it may be used on an intermediate portion of a linear body when such body continues uninterrupted past a termination fitting as on a tower or the like.

FIGS. 4–7 show one manner of bending an appliance to the shape shown and hereinabove described in detail. It will be appreciated, however, that many other manufacturing methods may also be suitably employed without in any way departing from the overall intent or scope of the present invention. FIG. 4 simply shows the entire appliance bent to a generally U-shaped configuration. The legs of this configuration are then each bent downwardly approximately 180 degrees as generally indicated by arrows 50 in FIG. 4 at bend points located at the ends of arms 18 on curved base portion 16 of bight portion B. This results in the configuration shown by FIG. 5.

Thereafter, the legs are moved upwardly out of the plane of the paper in FIG. 5 toward one another and arms 18 of bight portion B are rotated generally about their own axes approximately 180 degrees to achieve the configuration shown in FIG. 6 with loops 24 disposed in generally the same plane as legs 12. Thereafter, loops 24 are rotated toward one another approximately 90 degrees to achieve the configuration shown in FIGS. 7 and 1.

In the case of the embodiment of FIG. 3, legs 12 in FIG. 5 are rotated an additional 360 degrees to achieve the double loops. Thus, the left leg 12 in FIG. 5 would be rotated counterclockwise an additional 360 degrees while the right hand leg in FIG. 5 would be rotated clockwise an additional 360 degrees. The next bending steps would then be the same as shown in FIGS. 6 and 7, thus resulting in the double loop configuration of FIG. 3.

The invention has been described with reference to preferred embodiments. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. A dead-end appliance constructed primarily of relatively rigid linear elements for linear bodies and comprising: a pair of elongated legs with each leg being generally helically coiled along the longitudinal length thereof for grippingly receiving a portion of a linear body; an integral connecting portion connecting said legs at one end thereof; said connecting portion including integral pin receiving eyes and a bight portion; said eyes being interposed between said legs and bight portion; along the length of said elements; said eyes having eye axes lying in a plane extending generally perpendicular to said legs; and, said bight portion being positioned for attachment thereto of a linear body tensioning device extending therefrom on the same side of said plane as said legs.

2. The appliance as defined in claim 1 wherein said bight portion itself extends from said eyes on the same side of said plane as said legs.

3. The appliance as defined in claim 1 wherein said legs extend from said eyes inside of said bight portion such that said eyes and said bight portion are on opposite sides of said legs.

4. The appliance as defined in claim 1 wherein said eye axes are substantially coincidental.

5. The appliance as defined in claim 1 wherein said bight portion is generally U-shaped and includes a curved base having arms extending therefrom toward said eyes, said arms and said legs crossing one another at looped portions defining said eyes.

6. The appliance as defined in claim 5 wherein said looped portions comprise double looped portions.

7. The appliance as defined in claim 5 wherein said curved base is located on one side of the points where said arms and legs cross one another and said eyes are located on the other side of such points.

8. A dead-end appliance constructed primarily of relatively rigid linear elements for linear bodies comprising: a pair of elongated legs including gripping means for grippingly engaging a portion of a linear body; an integral connecting portion connecting said legs at one end thereof; said connecting portion including integral pin receiving eyes and a bight portion; said pin receiving eyes being interposed between said legs and bight portion along the length of said elements; and, said bight portion being located on the same side of said eyes as said legs.

9. The appliance as defined in claim 8 wherein said connecting portion includes looped portions which define said eyes and also connect said legs and said bight portion.

10. The appliance as defined in claim 9 wherein said looped portions comprise double looped portions.

11. The appliance as defined in claim 9 wherein said legs extend inside of said bight portion such that said eyes are located on one side of said legs and said bight portion is located on the other side of said legs.

* * * * *